April 7, 1936.     H. T. KINGSBURY     2,036,637
POSTAL SCALE
Filed Jan. 20, 1933     2 Sheets-Sheet 1
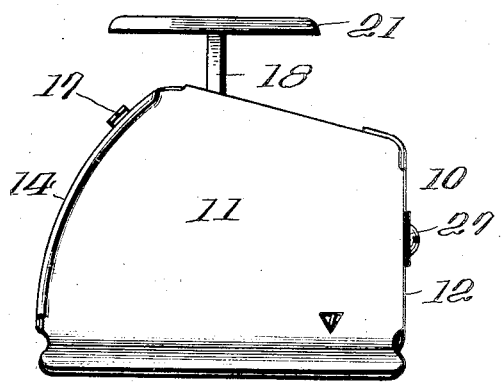
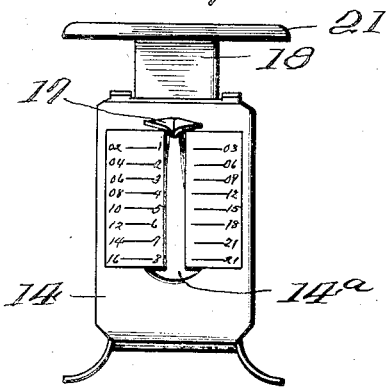
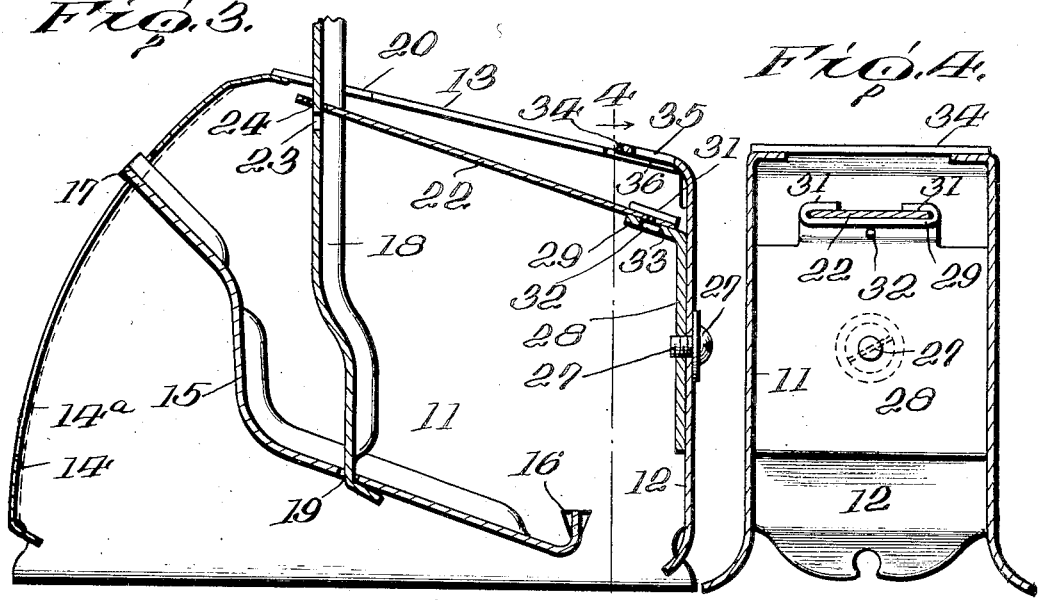
Inventor
Harry T. Kingsbury
By Sturtevant, Mason + Porter
Attorneys April 7, 1936.  H. T. KINGSBURY  2,036,637
POSTAL SCALE
Filed Jan. 20, 1933  2 Sheets-Sheet 2
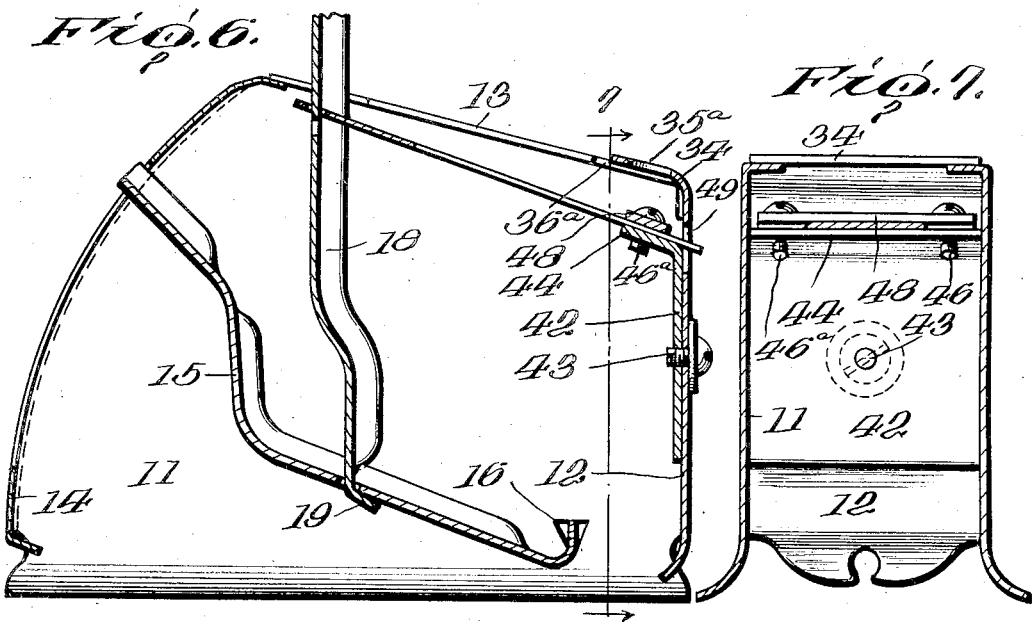
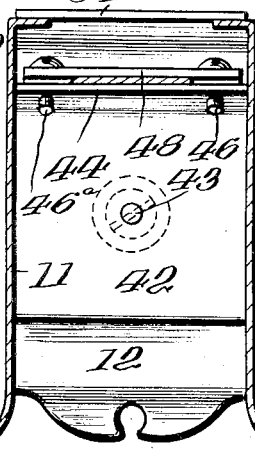
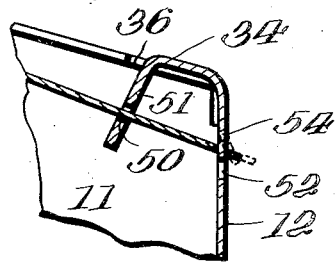
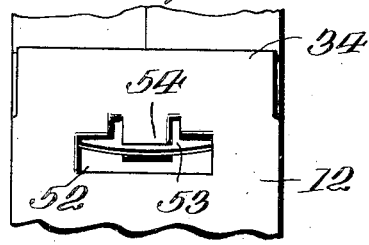
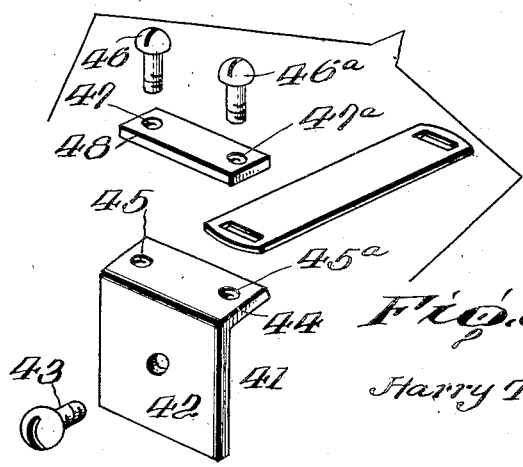
Inventor
Harry T. Kingsbury
By Sturtevant, Mason + Porter
Attorneys Patented Apr. 7, 1936

2,036,637

UNITED STATES PATENT OFFICE 2,036,637

POSTAL SCALE

Harry T. Kingsbury, Keene, N. H., assignor to Kingsbury Mfg. Company, Keene, N. H., a corporation of New Hampshire Application January 20, 1933, Serial No. 652,729

10 Claims. (Cl. 265—39)

This invention relates to improvements in weighing scales, and more particularly to improvements in postal scales of the type used in weighing letters, small packages, and other documents to be sent through the mails, or for other purposes.

In general, the present invention aims to provide a postal scale wherein the weighing mechanism is enclosed within a suitable casing. An indicating arm is pivotally mounted in the sides of the casing and has the platform supporting standard pivotally mounted thereon and extending through an opening in the casing. A flat resilient member is suitably connected at one end thereof to the casing and at the other end thereof to the platform supporting standard whereby to resist the downward movement of said standard and to aid in controlling the position of the same.

The principal object of the present invention is to provide a postal scale of the type referred to, wherein the downward movement of the platform supporting standard is resisted by a flat resilient member which is adjustable in order to insure correct scale readings regardless of any lack of uniformity in the length, thickness or quality of the flat resilient members which are used.

A further object of the invention is to provide a postal scale, of the type referred to, wherein the effective length of the flat resilient member may be varied in order to insure correct weight recording at all times.

A still further object of the invention is to provide a postal scale, of the type referred to, wherein means associated with the casing are provided for securing one end of the flat resilient member and for permitting the same to be shifted lengthwise thereof whereby to vary the resistance offered to the downward movement of the platform supporting standard.

The invention still further aims to provide an improved postal scale which is inexpensive to manufacture, easy to assemble, and capable of adjustment whereby accurate weighing may be obtained under all conditions.

These and other objects of the invention will be obvious and will be hereinafter more fully explained.

In the drawings:

Figure 1 is a side elevation of the assembled postal scale.

Fig. 2 is a front elevation of the assembled scale.

Fig. 3 is an enlarged side elevation, in section, showing the arrangement of the parts of the assembled scale.

Fig. 4 is a view, taken along line 4—4 of Fig. 3.

Fig. 5 is a perspective view of the adjustable resilient member and clamping device in detail.

Fig. 6 is a view, similar to Fig. 3, but showing a slight modification in the mounting of the resilient member.

Fig. 7 is a view, taken along line 7—7 of Fig. 6.

Fig. 8 is a perspective view, in detail, of the clamping device and resilient member as shown in Fig. 6.

Fig. 9 is a fragmentary side view, in section, showing another modified form of adjusting the resilient member.

Fig. 10 is a rear view of the same.

Referring particularly, at this time, to Figs. 1–5 of the accompanying drawings, it will be seen that the scale includes a casing 10 which is made from a metal blank which is bent to form sides 11, a rear closing portion 12, and a top closing portion 13. A graduated indicating plate 14 is secured over the front of the casing so that the weighing mechanism is enclosed therein. An indicating arm 15 is mounted within the casing and has one end thereof pivotally mounted in the openings 16 in the sides of the casing. The indicating arm has a pointer 17 which extends through a slot 14a in the indicating plate 14 and is adapted to travel over the graduated portion thereof. A standard 18, which is pivotally mounted at 19 to the indicating arm, extends upwardly therefrom and passes through an opening 20 in the top of the casing. A load receiving platform 21 is mounted on the end of the standard above the top of the casing. The component parts of the scale, thus far referred to in general, are more particularly described in detail in my co-pending application, filed January 4, 1933, and bearing Serial Number 650,187.

One end of a flat resilient or spring member 22 is adapted to pass through a slot 23 in the standard 18 which is, in turn, provided with a depending lug 24 which enters a slot 25 in the end of the spring member in a manner similar to that shown in my co-pending application which is referred to above. This pivotal connection does not interfere with the vertical movement of the standard but aids in preventing the standard from tilting. A bracket member 26 is secured to the inside of the rear of the casing by a screw 27 or the like. This bracket 26 comprises a portion 28 which lies against the inside surface of the back of the casing and an inwardly extending portion 29 which is bent toward the center of the casing from the top of the portion 28 of the bracket. The edges 30, 31 of the portion 29 are turned upon the top surface thereof to provide a clamping device for the opposite end of the spring 22. In the portion 29 is a centrally located slot 32, the major axis of which is substantially parallel to the sides of the turned over edges 30, 31. The end of the spring member 22, which is adapted to be clamped by the edges 30, 31, is provided with an opening 33 which registers with the slot 32 in the portion 29 of the bracket. The end of the flat spring member 22 is held between the edges 30, 31 and the portion 29 by frictional engagement. It will be seen, by referring to Fig. 3, that one end of the spring member 22 is suitably connected to the standard 18 while the opposite end is rigidly connected to the bracket 26 which is secured to the rear of the casing. The downward movement of the platform 21, when a load is placed thereon, will depress the standard and indicating arm 15 which causes the pointer 17 to register the correct weight on the indicating plate 14. The spring member 22 is adapted to resist this downward movement of the weighing mechanism.

It has been found practically impossible to furnish spring members 22 in quantity where each spring member will be uniform in every respect. For this reason, it has been found to be necessary to adjust the spring in some manner to compensate for this lack of uniformity, so that the correct weight will be indicated on the plate 14. A lip portion 34 on the back 12 of the casing is bent over the top of the casing, as shown in Fig. 3. This lip portion 34 is provided with an opening 35 which registers with an opening 36 in the top of the casing whereby a key 37 may be inserted. The key 37 has a lug portion 38 and a shoulder 39. The lug portion 38 is adapted to pass through the opening 33 in the spring member 22 and the slot 32 in the portion 29 of the bracket 26. The key 37 is inserted so that the shoulder portion 39 fits in a groove 40 in the turned over edge 30 of the portion 29. The shoulder 39 is fixed in the groove at one end but is permitted to turn slightly whereby the lug 38, which passes through the spring 33 in the spring member, will move the spring member when the key is turned. In this manner, the effective or lever length of the spring member from the bracket 26 to the standard 18 is varied in order to increase or diminish the resistance offered to the downward movement of the standard. As stated above, the standard has a limited pivotal connection with the indicating arm 15, as at 19, so that the standard will not prevent the spring 22 from being shifted. The opening 20 in the casing is, of course, of sufficient size to permit this very slight movement when the spring is adjusted.

In Figs. 6, 7, and 8, a slightly modified form of bracket is provided for supporting the spring member 22. The bracket 41 has a flat portion 42 which is secured to the back of the casing by a screw 43 or the like in a manner similar to that shown in Fig. 3. An inwardly extending portion 44 is provided with threaded openings 45, 45ª to receive screws 46, 46ª which pass through openings 47, 47ª in a clamping plate 48. One end of the spring member 22 is inserted between the clamping plate 48 and the inwardly extending portion 44 and is firmly clamped therebetween when the screws 46, 46ª are tightened. A screw driver or other implement may be inserted through openings 35ª in the lip portion 34 and openings 36ª in the top of the casing to release or secure the clamping plate 48. The end of the spring 22 extends through an opening 49 in the back of the casing so that the same may be manually shifted, when the clamping plate is loosened, to vary the effective length of the spring from the bracket 41 to the standard 18 whereby to insure correct reading on the indicating plate 14.

In Figs. 9 and 10, the spring member 22 passes through a slot 50 in a fulcrum member 51 which is a continuation of the lip portion 34 but which is bent through the opening 36 in the top of the casing so that it extends into the interior of the casing. This structure is shown and claimed in my co-pending application, above referred to. The end of the spring member 22 is adapted to pass through an opening 52 in the rear of the casing and is provided with a slot 53 into which extends a tongue member 54 which is part of the back of the casing. The opposite end of the spring 22 is secured to the standard 18 (not shown) in the same manner as set forth above. In this form, the tongue member 54 may be bent, and in so doing, the spring is shifted in the slot 50 in the fulcrum 51 so that the effective length of the spring from the fulcrum to the standard is varied whereby the resistance offered to the downward movement of the standard may be changed to provide accurate weighing under any circumstances.

When a load is placed upon the platform 21, the standard 18 will move downwardly and so rotate the indicating arm 15 so that the pointer 17 will travel over the indicating plate 14 and indicate the correct weight of the article placed upon the platform. The flat spring member 22 will offer a certain amount of resistance to the downward movement of the standard, since one end of the said spring member is secured to the standard. The opposite end of the spring member is fixedly secured to the casing in the manner heretofore described. If the pointer on the indicating arm does not register the correct weight, it is necessary to vary the tension of the spring member so that the resistance offered to the downward movement of the standard may be changed, so that the weight indication will be accurate. For this purpose, one end of the spring 22 is clamped in a bracket of the form shown either in Fig. 3 or Fig. 6, the opposite end being pivotally secured to the standard 18. The end of the spring, which is secured in the bracket, may be shifted lengthwise, as heretofore described, so that the length of the spring between the fixed bracket and the standard may be varied. In this way, the resistance exerted by the spring member against the tendency of the standard to move downwardly may be varied. The standard, being pivotally secured at 19 to the indicating arm 15, will permit the shifting of the spring 22 and by decreasing the effective length or lever distance of the spring from the fixed point on the bracket to the standard which is moved slightly, the movement of elastic resistance offered by the spring will be increased. Conversely, by increasing the effective length of the spring, the movement of elastic resistance of the spring will be decreased. Thus, the pointer 17 may be adjusted to point to the correct mark on the indicating plate and any load on the platform may be accurately weighed. In a similar manner, referring to Figs. 9 and 10, the fulcrum 51 is a fixed point and the bending of the tongue 54 will shift the spring and so vary the length thereof from the fulcrum to the standard.

It is, thus, apparent that in every instance, the length of the spring member 22 from a fixed point to the standard is varied to properly adjust the scale. The fixed point is a bracket 26 in Fig. 3, a somewhat similar bracket in Fig. 6, and a fulcrum 51 in Fig. 9. It is also obvious that screw clamps may be provided in the edges 30, 31 of the bracket 26 and that a key may be employed with the bracket 41 by providing suitable openings.

From the foregoing description, it is apparent that minor changes in details of construction may be made without departing from the scope of the invention as set forth in the following claims.

Having thus fully described my invention, what I claim as new and desire to secure by Letters Patent, is:—

1. A postal scale comprising a casing, an indicating arm, a platform supporting standard pivotally mounted thereon, a flat spring member having a limited pivotal connection with said standard and adapted to resist the downward movement thereof, a fixed member associated with the casing and upon which an adjacent portion of the spring member is adapted to rest, and means for varying the length between said fixed member and said standard by the lengthwise shifting of said spring member whereby to vary the resistance offered to the downward movement of the standard.

2. A postal scale comprising a casing, an indicating arm, a platform supporting standard pivotally mounted thereon, a flat spring member secured at one end to the standard, and a clamping device for holding said spring member adjacent the opposite end thereof, said clamping device being adapted to permit the lengthwise sliding of said spring member whereby to vary the length of said spring member between said clamping device and said standard.

3. A postal scale comprising a casing, an indicating arm pivotally mounted in said casing, a platform supporting standard mounted on said indicating arm and having a limited pivotal movement thereon, a bracket mounted on said casing, a flat resilient member having one end mounted on said bracket, means for connecting the opposite end of said resilient member to said standard, and means for permitting the lengthwise shifting of said resilient member in said bracket whereby to properly adjust the scale.

4. A postal scale comprising a casing, an indicating arm pivotally mounted in said casing, a platform supporting standard mounted on said indicating arm and having a limited pivotal movement thereon, a flat spring member adapted to resist the downward movement of said standard, means for connecting one end of said resilient member to said standard, said casing having a depending portion adapted to support an intermediate part of said resilient member, and means for connecting the opposite end of said resilient member to said casing whereby said resilient member may be shifted bodily to adjust the weighing mechanism and insure correct weighing.

5. A postal scale comprising a casing, an indicating arm, a platform supporting standard, means for providing a pivotal connection between said arm and said standard, a spring member adapted to resist the downward movement of said standard, means for providing a pivotal connection between one end of said spring member and said standard, and means associated with said casing for holding the opposite end of said spring member in a manner permitting the bodily shifting thereof whereby to adjust the same to permit correct weighing.

6. A postal scale comprising a casing, an indicating arm mounted in said casing, a platform supporting standard, a flat spring member having one end thereof connected to said standard, means for mounting the opposite end of said spring member in a manner to permit lengthwise shifting thereof for adjustment purposes, and means for pivotally mounting said standard on said indicating arm to permit the shifting of said spring member.

7. A postal scale comprising a casing, an indicating arm pivotally mounted within said casing, a platform supporting standard, a flat spring member having one end connected to said standard and adapted to resist the downward movement thereof, a bracket secured to said casing and adapted to support the opposite end of said spring member for lengthwise shifting when desired for adjusting the scale, and means for pivotally mounting said standard on said indicating arm whereby to permit the shifting of said spring member.

8. A postal scale comprising a casing, an indicating arm pivotally mounted within said casing, a platform supporting standard, a flat spring member having one end connected to said standard and adapted to resist the downward movement thereof, a bracket mounted on said casing and having a laterally projecting portion with overlying edges adapted to hold the opposite end of said spring member, means including a key and slot connection for shifting said spring member lengthwise to adjust the scale, and means for pivotally mounting said standard on said indicating arm whereby to permit the shifting of said spring member.

9. A postal scale comprising a casing, an indicating arm pivotally mounted within said casing, a platform supporting standard, a flat spring member having one end connected to said standard, a bracket mounted on said casing, a clamping plate removably secured to said bracket and adapted to hold the opposite end of said spring member, and means for pivotally mounting said standard on said indicating arm whereby to permit the lengthwise shifting of said spring member when said clamping plate is released.

10. A postal scale comprising a casing, an indicating arm pivotally mounted within said casing, a platform supporting standard, a flat spring member having one end connected to said standard and adapted to resist the downward movement thereof, means including a depending member on said casing for supporting the opposite end of said spring member for lengthwise movement when desired, and means for pivotally mounting said standard on said indicating arm to permit the shifting of said spring member for adjustment of the scale.

HARRY T. KINGSBURY.